C. A. LUNDY.
GAS ENGINE.
APPLICATION FILED DEC. 9, 1912.

1,091,854.

Patented Mar. 31, 1914.
2 SHEETS—SHEET 1.

WITNESSES
F. C. Fiedner
S. Constine.

INVENTOR
Charles A. Lundy
BY
Wm. F. Booth
ATTORNEY

UNITED STATES PATENT OFFICE.

CHARLES A. LUNDY, OF RENO, NEVADA.

GAS-ENGINE.

1,091,854.

Specification of Letters Patent. Patented Mar. 31, 1914.

Application filed December 9, 1912. Serial No. 735,589.

*To all whom it may concern:*

Be it known that I, CHARLES A. LUNDY, a citizen of the United States, residing at Reno, in the county of Washoe and State of Nevada, have invented certain new and useful Improvements in Gas-Engines, of which the following is a specification.

My invention relates to the class of gas-engines. Its objects are to avoid the use of puppet valves and to provide a simple, effective and durable construction and arrangement especially adapted for air-cooled engines, by which the explosive mixture is admitted to the cylinder, is exploded therein, and the products of explosive combustion are exhausted therefrom in timely succession.

To these ends my invention consists in the novel gas-engine which I shall now fully describe by reference to the accompanying drawings in which—

Figure 1:
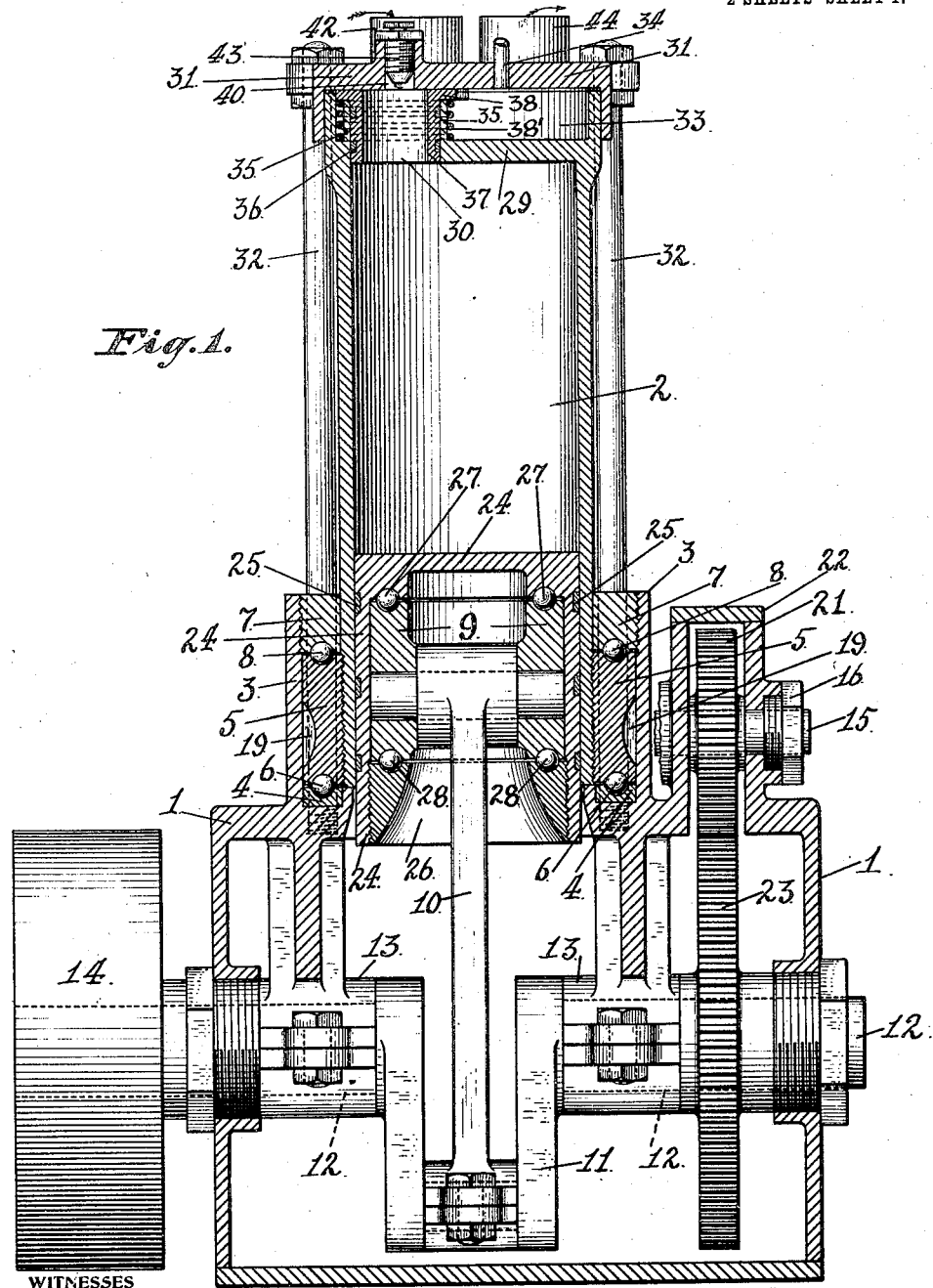
Figure 2:
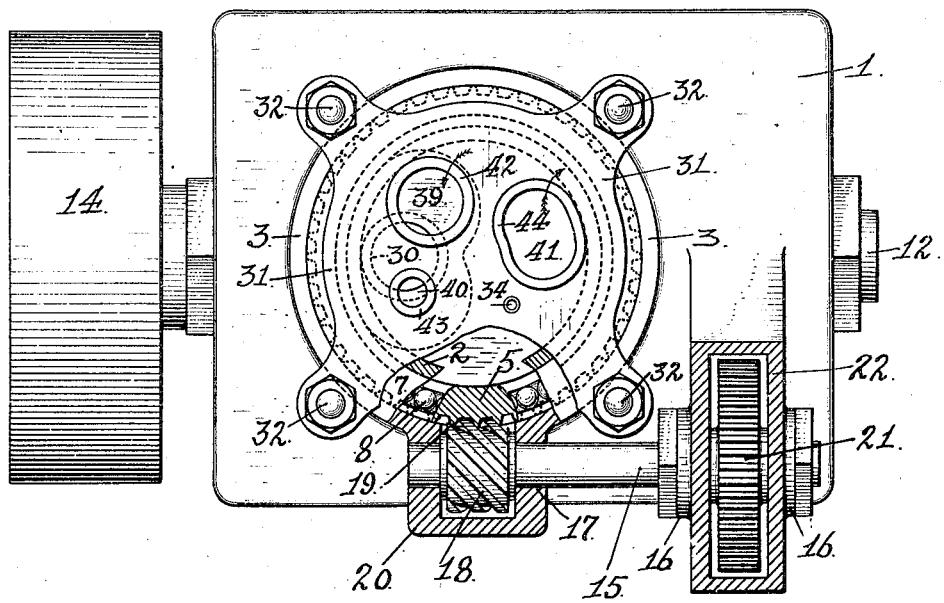

Figure 1 is a vertical section of my gas-engine. Fig. 2 is a plan of the same, broken in part.

1 is the crank case which also forms the bed, and 2 is the cylinder. I have here shown but one cylinder though it will be readily understood that the engine may comprise a plurality of cylinders. The cylinder is revolubly locked to the bed by any suitable connection which will enable it to resist end-thrust due to explosion and will adapt it for rotation about its axis. The connection which I deem the best and which I have illustrated is constructed as follows: The top of the crank case or bed 1 is formed or is provided with an annular flange or seat 3. In the base of the seat is an annular bearing ring 4 in the upper surface of which is a ball-race. The lower end of the cylinder is fitted in the seat 3 and said end is provided with or has secured to it a bearing collar 5, which is here shown as screwed upon it, said collar having in its lower face a ball-race. Balls 6 lie in the opposing raceways of the ring 4 and collar 5 and form the support for the cylinder. In the upper face of the bearing collar 5 is a ball-race. Screwed into the top of the seat 3 is an annular nut 7 in the lower face of which is a ball-race. Balls 8 lie in the opposing races of the collar 5 and the nut 7 and form the upper or lock connection for the cylinder. Thus between the two sets of ball bearings the cylinder is locked against end thrust and is adapted for free rotation on its axis. Suitable means driven by the engine are provided to effect this rotation. These in their best form are here shown as follows: 9 is the piston mounted in the cylinder, and 10 is its connecting rod. This rod passes down into the bed or crank case 1 and is connected with the crank 11 of the crank shaft 12, which is mounted in bearings 13 in the bed and carries the fly wheel 14. 15 is a countershaft mounted in suitable bearings 16 and 17, as shown in Fig. 2, and said shaft carries a worm 18 meshing with a worm gear 19 which in the present case is shown as formed integral with the bearing collar 5, on the cylinder 2. The worm 18 is best inclosed in a suitable housing 20 formed with the seat 3, as seen in Fig. 2. Upon the end of the countershaft is a gear 21 housed in an extension 22 of the crank case or bed 1. With this gear 21 engages a gear 23 on the crank shaft 12. It will be readily understood by those skilled in the art that these power transmitting connections are properly proportioned to effect the timely rotation of the cylinder as will presently appear.

In order to make a proper gas tight anti-friction bearing between the rotatable cylinder and its non-rotatable reciprocative piston, I employ the following construction: The piston 9 is provided with an outer shell 24 fitted with packing rings 25 between its outer surface and the cylinder wall. The top of the shell 24 is closed and its open bottom has screwed into it a bearing ring 26. Ball bearings 27 lie between the upper end of the piston and the closed top of the shell, and other ball bearings 28 are disposed between the base of the piston and the bearing ring 26 of the shell. It will now be seen that the shell 24 reciprocates with the piston and rotates with the cylinder and that the connection is gas tight and anti-frictional. The head 29 of the cylinder 2 is provided with a single port 30.

Fitted over the top of the cylinder 2 is a non-rotatable cap 31, secured by bolts 32 to the bed 1. The cap is raised above the head of the cylinder sufficiently to leave a chamber 33 between the two, and this chamber is supplied with a lubricant through an oil feed 34 in the cap. The port 30 in the cylinder head has an uprising border flange 35 in which is seated, with packing rings 36, a sleeve 37 having a smooth face top flange 38 which, under the influence of a spring 38', bears directly up under and forms a slidable contact with the lower face of the cap. Both contact faces are made smooth and being lubricated by the oil in chamber 33 the friction is negligible, while a sufficiently tight joint is made.

In the cap 31 is made an opening 39, also a second opening 40 and also a third opening 41. These are arranged in circular series, as seen in Fig. 2, and with them the port 30 in the cylinder head 29 successively and timely registers, by the rotation of the cylinder. With the cap opening 39 is made the intake connection 42 for the explosive mixture. In the opening 40 is fitted the spark plug 43 for exploding the mixture; and with the opening 41 is made the exhaust connection 44 for discharging the products of explosive combustion.

This engine is adapted particularly for air-cooling; by necessity, because the rotation of the cylinder renders it impracticable or at least not adapted for water-cooling; and, by design, because the rotation of the cylinder is itself a factor in air-cooling, to which end the exterior surface of the cylinder may be rendered more extensively exposed by the well known methods of flanging, cupping, indenting, etc.

In operation the rotation of the cylinder on its axis carries its head port 30 into successive and timely register with the intake, sparking and exhaust connections. The dimensions of the cylinder head port 30 and the relation of the intake and exhaust openings 39 and 41 are such as shown in Fig. 2, that as the intake is just opening the exhaust is about to be but is not quite closed, so that the final products of combustion are fully driven out.

Friction is reduced to a minimum and the lubrication is such that the operation is noiseless. There is little wear so that the joints keep tight, and all the parts are durable and require the least attention as they are not likely to get out of order nor to become unclean, and moreover the spark plug is only exposed to the cylinder when firing so that it will not collect carbon.

I claim:—

1. In a gas engine, the combination of a fixed bed having an annular seat with a ball-race bearing ring in its lower portion; a cylinder having its base fitted in said seat and provided with an encircling bearing collar having a ball-race in its lower face, said collar being provided also with a ball-race in its upper face; an annular nut screwed into the upper portion of the bed-seat and having a ball-race in its lower face; balls in said races; means called into timely action by the rotation of the cylinder for charging said cylinder with an explosive mixture, exploding said mixture and exhausting the products of explosive combustion; and means driven by the engine for effecting the timely rotation of the cylinder.

2. In a gas engine, the combination of a fixed bed having an annular seat with a ball-race bearing ring in its lower portion; a cylinder having its base fitted in said seat and provided with an encircling bearing collar having a ball-race in its lower face, said collar being provided also with a ball-race in its upper face; an annular nut screwed into the upper portion of the bed-seat and having a ball-race in its lower face; balls in said races; means called into timely action by the rotation of the cylinder for charging said cylinder with an explosive mixture, exploding said mixture and exhausting the products of explosive combustion; and means driven by the engine for effecting the timely rotation of the cylinder, said means comprising a piston, connecting rod, crankshaft, a countershaft driven by the crankshaft, a worm on the countershaft and a worm gear on the bearing collar of the cylinder.

3. In a gas engine, the combination of a fixed bed having an annular seat; a cylinder having a single port in its head, said cylinder having its base fitted in the bed seat; means for revolubly locking said cylinder in its seat to resist end thrust and to adapt it for rotation about its axis; a nonrotatable cap fitted to the cylinder head and bolts passing down outside said cylinder and securing said cap fixedly to the bed, said cap having separate openings with which the port in the cylinder head is adapted to successively register as the cylinder rotates; an intake connection with one of said cap-openings for the explosive mixture; a spark-plug fitted in another of said cap-openings for exploding said mixture; and an exhaust connection with still another of said cap-openings for discharging the products of explosive combustion; and means driven by the engine for effecting the timely rotation of the cylinder.

4. In a gas engine, the combination of a cylinder arranged for rotation about its axis; means called into timely action by the rotation of the cylinder for charging said cylinder with an explosive mixture, exploding said mixture and exhausting the products of explosive combustion; a piston in said cylinder, having a closed-top outer shell packed in the cylinder adapted for reciprocative motion with the piston; a journal-bearing between the piston and its shell adapting the latter for rotation with the cylinder; and means driven by the piston for effecting the timely rotation of the cylinder.

5. In a gas engine, the combination of a cylinder arranged for rotation about its axis; means called into timely action by the rotation of the cylinder for charging said cylinder with an explosive mixture, exploding said mixture and exhausting the products of explosive combustion; a piston in said cylinder having a closed-top outer shell packed in the cylinder adapted for reciprocative motion with the piston; ball-bearings between the upper and lower ends of the piston and its shell adapting the latter for rotation with the cylinder; a connecting rod from the piston; a crank-shaft driven by said rod; and means driven by the crank-shaft for effecting the timely rotation of the cylinder.

6. In a gas engine, the combination of a cylinder arranged for rotation about its axis, said cylinder having a single port in its head, and said port being provided with an uprising annular border flange; a spring controlled sleeve fitted with packing in said border flange and having a smooth-face top flange; a non-rotatable cap fitted over the cylinder head and spaced therefrom to form an oil chamber, the smooth-face top flange of the sleeve moving in contact with the under surface of said cap, said cap having separate openings with which the port in the cylinder head is adapted to successively register as the cylinder rotates; an intake connection with one of said cap-openings for the explosive mixture; a spark-plug fitted in another of said cap-openings for exploding said mixture; and an exhaust connection with still another of said cap-openings for discharging the products of explosive combustion; and means driven by the engine for effecting the timely rotation of the cylinder.

In testimony whereof I have signed my name to this specification in the presence of two subscribing witnesses.

CHARLES A. LUNDY.

Witnesses:
LEE J. DAVIS,
S. H. ROSENTHAL.